United States Patent Office 3,442,894
Patented May 6, 1969

3,442,894
**2,5-BIS-(AMINOALKOXYPHENYL) THIAZOLO
[5,4-d]THIAZOLES**
Paul Schmidt, Therwil, Switzerland, assignor to Ciba
Corporation, New York, N.Y., a corporation of
Delaware
No Drawing. Filed Oct. 15, 1965, Ser. No. 496,662
Claims priority, application Switzerland, Nov. 26, 1964,
15,246/64
Int. Cl. C07d 91/32, 91/42; A61k 27/00
U.S. Cl. 260—246               9 Claims

ABSTRACT OF THE DISCLOSURE 2,5-bis - (aminoalkoxyphenyl)-thiazolo[5,4-d]thiazoles of the formula

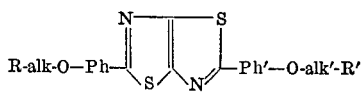

in which R and R' each represents an amino group, alk and alk' each represents an alkylene radical containing at least 2 carbon atoms and Ph and Ph' each stands for a phenylene group, and their salts. The compounds are useful because of their tuberculostatic and antiparasitic effects.

---

The present invention relates to new thiazolo[5,4-d] thiazoles. Especially it concerns 2,5-bis-(amino-alkoxyphenyl)-thiazolo[5,4-d]thiazoles of the formula

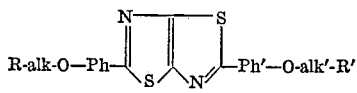

in which R and R' each represents an amino group, alk and alk' each represents an alkylene radical containing at least 2 carbon atoms and Ph and Ph' each stands for a phenylene group, and their salts.

The amino groups R and R', which may be identical or different, may be unsubstituted or substituted. Preferably, R and R' are tertiary amino groups.

As substituents for the amino groups there are suitable above all lower hydrocarbon residues, which may be interrupted by hetero atoms such as oxygen, sulfur or nitrogen; if desired, they may be linked with the alkylene radical and/or they may be substituted by free hydroxyl groups. As lower hydrocarbon residues there may be mentioned above all: lower alkyl or alkenyl radicals such as methyl, ethyl, propyl or isopropyl; straight or branched butyl, pentyl, hexyl or heptyl groups which may be linked in any desired position; allyl or metallyl groups, unsubstituted or alkyl-substituted cycloalkyl or cycloalkenyl residues such as cyclopentyl, cyclohexyl, cycloheptyl, cyclopentenyl, cyclohexenyl residues; phenyl-lower alkyl or phenyl-lower alkenyl such as phenylmethyl, -ethyl, -vinyl or -propyl residues, or alkylene residues such, for example, as butylene(1,4), pentylene(1,5), 1,5-dimethylpentylene(1,5), hexylene(1,6), hexylene(1,5). Residues of this type interrupted by one hetero atom are, for example, alkoxyalkyl residues such as methoxyethyl or ethoxyethyl, oxa-, aza- or thia-alkylene residues such as 2-aza-, 2-oxa- or 2-thia-butylene(1,4) residues, 3-aza-, 3-oxa- or 3-thia-pentylene(1,5), 3-aza-hexylene(1,6), 1,5 - dimethyl - 3-aza-pentylene(1,5), 3-methyl - 3-aza-pentylene(1,5) or 3 - hydroxyethyl-3-aza-pentylene(1,5).

The amino groups are in the first place di-lower alkylamino groups such as dimethylamino, diethylamino, dipropylamino or N-methyl-N-ethylamino groups, N-lower alkyl-N-cycloalkylamino groups such as N-methyl-N-cyclopentyl- or cyclohexylamino groups, pyrrolidino, piperidino, morpholino or thia-morpholino groups such as pyrrolidino, piperidino, morpholino, piperazino, N methyl - piperazino or N-(β-hydroxyethyl) - piperazino groups.

The alkylene radicals alk and alk', which may be identical or different, are above all straight or preferably branched lower alkylene groups containing 2 to 6, more especially 2 to 3, carbon atoms, such as ethylene, or straight or preferably branched propylene, butylene, pentylene or hexylene residues.

The phenylene residues Ph and Ph' may be unsubstituted, mono- or polysubstituted. Particularly suitable relevant substituents are lower alkyl radicals, for example those mentioned above, lower alkoxy groups such as methoxy, ethoxy, propoxy or butoxy groups, halogen atoms such as fluorine, chlorine or bromine, or the pseudohalogen trifluoromethyl. The residues Ph and Ph' are preferably paraphenylene radicals.

The new compounds possess valuable pharmacological properties. Besides having a tuberculostatic effect, they also show in particular an antiparasitary activity, as has been shown in animal experiments, for example in mice or hamsters. They also possess a trypanocidic activity in animal experiments, for example in the mouse. The new compounds are therefore useful as chemotherapeutics in tuberculosis or in amoebic or other protozoan infections. As demonstrated by experiments on rats, the compounds further have a hypocholesteraemic effect and may be used for the treatment of arteriosclerotic changes in the blood vessels. They are also valuable intermediates for the manufacture of medicaments.

Specially mentioned should be the compounds of the formula

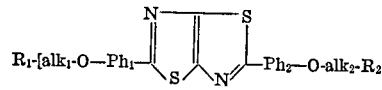

where $R_1$ and $R_2$ each represents a lower dialkylamino group or a pyrrolidino, piperidino, morpholino or piperazino groups, for example an N-(lower alkyl)- or N-(hydroxy-lower alkyl)-piperazino group; $alk_1$ and $alk_2$ each represents a lower, preferably branched, alkylene radical containing at least 2 carbon atoms, and $Ph_1$ and $Ph_2$ each represents a phenylene radical which may be unsubstituted or monosubstituted by a lower alkyl or lower alkoxy group, by a halogen atom or a trifluoromethyl group, more especially a para-phenylene residue which may be monosubstituted by a lower alkyl or lower alkoxy radical, by a halogen atom or a trifluoromethyl group or especially an unsubstituted para-phenylene group, and among them especially 2,5-bis-[para-(β-dimethylamino-α-methylethoxy)-phenyl]-thiazolo[5,4-d]thiazole and primarily 2,5 - bis[para-(β - diethylaminoethoxy)-phenyl]-thiazolo [5,4-d]thiazole which, for example in the form of its dihydrochloride shows a distinct amoebicidal effect in hamsters when administered orally in a dosage of 10 to 30 mg./kg.

The new compounds are manufactured by methods as such known.

For example, a thiazolo[5,4-d]thiazole of the formula

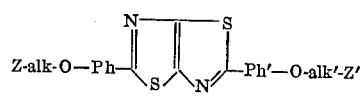

in which Ph, Ph', alk and alk' have the above meanings and Z and Z' stand for halogen atoms, such as chlorine or bromine atoms, is reacted with ammonia or a primary or secondary amine of the frmula RH and/or R'H.

The reaction is carried out in the usual manner.

According to another process, the new compounds are obtained when a bis-(hydroxy-phenyl)-thiazolo[5,4-d]-thiazole of the formula

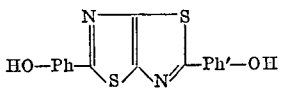

in which Ph and Ph' have the above meanings, is reacted with an aminoalkyl halide, especially the bromide or chloride.

The reaction is carried out in the usual manner. The bis-(hydroxyphenyl)-thiazolo[5,4-d]thiazole of the above formula is preferably used in the form of a metal salt, for example an alkali metal salt or the reaction is carried out in the presence of a condensing agent capable of forming such a salt, such as an alkali metal alcoholate, for example sodium ethylate.

Depending on the reaction conditions and starting materials used the final products are obtained in the free form or in the form of their salts which are likewise included in the present invention. The salts of the final products can be converted into the free bases in known manner, for example with alkalies or ion exchange resins. When the free bases are reacted with organic or inorganic acids, more especially those which are suitable for the formation of therapeutically useful salts, they give rise to salts. As such acids there may be mentioned, for example, hydrohalic, sulphuric or phosphoric acids, nitric or perchloric acid; aliphatic, alicyclic, aromatic or heterocyclic carboxylic or sulphonic acids such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicylic or para-aminosalicylic, embonic, methanesulphonic, ethanesulphonic, hydroxyethanesulphonic, ethylenesulphonic acid; halogenbenzenesulphonic, toluenesulphonic, naphthalenesulphonic acids or sulphanilic acid; methionine, tryptophan, lysine or arginine.

These or other salts of the new compounds, for example the picrates, may also be used for purifying the resulting free bases by converting them into salts, isolating the salts and liberating the bases from them. In view of the close relationship between the new compounds in the free form and in the form of their salts, what has been said above and in the following concerning the free bases applies similarly and suitably also to any corresponding salt.

The invention includes also any modification of the present process in which an intermediate obtainable at any stage of the process is used as starting material and any remaining step or steps is/are carried out or in which the starting materials are formed during the reaction, or in which the reactants are used in the form of their salts.

Thus, for example, the starting material may be a suitable 2-(aminoalkoxyphenyl) - 5 - (X-phenyl)-thiazolo[5,4-d]thiazole where X represents a hydroxyl group or a group of the formula —O—alk'—Z' in which Z' and alk' have the above meanings, and this residue X is then converted into an aminoalkoxy radical, for example as indicated above. In this manner it is possible to manufacture, for example, compounds in which the two aminoalkoxy groups are different from each other.

The reactions of the invention are advantageously carried out with starting materials that give rise to the preferred products mentioned above.

The starting materials are known or can be prepared by known methods.

The new intermediates formed in the manufacture of the 2,5-bis-(aminoalkoxyphenyl)-thiazolo[5,4-d]thiazoles are likewise included in the invention. More especially, the compounds of the formula

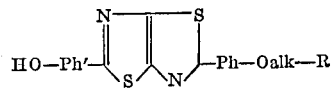

where Ph', Ph, alk and R have the above meanings, are still new and likewise possess antiparasitary and microbicidal as well as hypocholesteraemic properties.

They are prepared by known methods. Thus, for example, in a compound of the formula

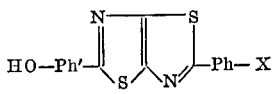

where X has the meanings given above, X is so converted, for example by one of the methods described above.

Compounds that contain one or several asymmetric carbon atoms, for example in the alkylene residue(s) alk and/or alk', may take the form of racemate mixtures, pure racemates or optical antipodes.

Racemate mixtures can be resolved in the known manner into the stereoisomeric (diastereromeric) racemates by virtue of the physico-chemical differences in the constituents, for example by chromatography and/or fractional crystallisation.

Racemic starting or final products can likewise be resolved by known methods into the optical antipodes, for example in the following manner; The racemic bases are dissolved in a suitable inert solvent, reacted with an optically active acid and the resulting salts are resolved into the diastereomers, for example using their different solubilities, and from the diastereomers the antipodes of the new bases can be liberated by treatment with an alkaline agent. Preferred optically active acids ar the D- and L-forms of tartaric acid, di-ortho-toluyltartaric acid, malic, mandelic, camphorsulphonic or quinic acid. Alternatively, the resolution may be performed, for example, by recrystallising the resulting pure racemate from an optically active solvent. It is preferable to isolate the more active of the two antipodes.

The new compounds may be used, for example, in the form of pharmaceutical preparations which contain them in the free form or in the form of their salts in conjunction or admixture with an organic or inorganic, solid or liquid pharmaceutical excipient suitable for enteral, parenteral or topical administration. Suitable excipients are substances that do not react with the new compounds, for example water, gelatine, lactose, starches, stearyl alcohol, magnesium stearate, talcum, vegetable oils, benzyl alcohol, gums, propyleneglycols, white petroleum jelly, cholesterol or other known medicinal excipients. The pharmacentical preparations may be, for example, tablets, dragees, capsules, ointments or creams, or in liquid form solutions, suspensions or emulsions. They may be sterilised and/or may contain assistants, such as preserving, stabilising, wetting or emulsifying agents, solution promoters, salts for regulating the osmotic pressure or buffers. They may also contain further therapeutically valuable substances. The pharmaceutical preparations are formulated by known methods.

The new compounds may also be used in veterinary medicine, for example in one of the forms mentioned above or in the form of animal fodders or additives to animal fodders, using, for example, the usual extending or diluting agents or animal fodders respectively.

The following examples illustrate the invention.

EXAMPLE 1

13 g. of 2,5-bis-(para-hydroxyphenyl)-thiazolo[5,4-d] thiazole are added to a solution of sodium ethylate prepared from 1.9 g. of sodium and 500 cc. of alcohol. To form the sodium salt the batch is stirred for ½ hour at room temperature. Thereupon 13 g. of β-diethylaminoethyl chloride are added, the whole is heated for 4 hours at the boil, allowed to cool and the precipitate is suctioned off. On recrystallisation from much boiling alcohol there is obtained the 2,5-bis-[para-(β-diethylaminoethoxy)phenyl]-thiazolo[5,4-d]thiazole of the formula

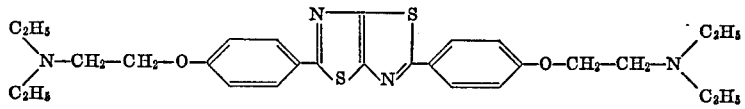

in yellow crystals melting at 173–174° C.

Its bis-hydrochloride, melting at 295° C., with decomposition, can be manufactured in the usual manner.

The 2,5 - bis-(para-hydroxyphenyl)-triazolo[5,4-d]thiazole used as starting material is obtained by heating a solution of 13.8 g. of dithiooxamide and 34.2 g. of para-hydroxybenzaldehyde in 150 cc. of dimethylformamide for 15 hours in a bath maintained at 170° C. It melts at about 360° C. with decomposition.

EXAMPLE 2

14 g. of 2,5-bis-(para-hydroxyphenyl)-triazolo[5,4-d]thiazole are added to a sodium alcoholate solution prepared from 2 g. of sodium and 500 cc. of alcohol. To form the sodium salt the batch is stirred for ½ hour at room temperature. 13.4 g. of 1-dimethylamino-2-chloropropane are then added, the mixture is heated for 4 hours at the boil, allowed to cool, and the precipitated salt is suctioned off. The filtrate is concentrated to about 100 cc., and the precipitate is suctioned off. On recrystallization from much hot alcohol the 2,5-bis-[para-(β-dimethylamino-α-methylethoxy)-phenyl]-thiazolo[5,4-d]thiazole of the formula

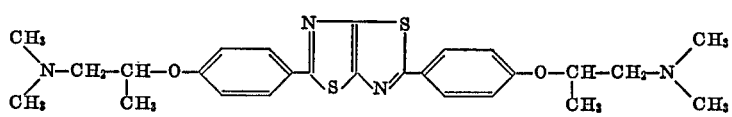

is obtained in yellow crystals melting at 181–182° C. Its bis-hydrochloride melts at about 300° C. with decomposition.

EXAMPLE 3

11.4 g. of 2,5-bis-(ortho-hydroxyphenyl)-thiazolo[5,4-d]thiazole are added to a sodium alcoholate solution prepared from 1.65 g. of sodium and 500 cc. of alcohol. To form the sodium salt the batch is stirred for ½ hour at room temperature. 11.5 g. of β-diethylaminoethyl chloride are then added, the whole is heated for 4 hours at the boil, allowed to cool, and the precipitate is suctioned off and repeatedly washed with water. On recrystallisation from much boiling alcohol the 2,5-bis-[ortho-(β-diethylaminoethoxy)-phenyl]-thiazolo[5,4-d]thiazole of the formula

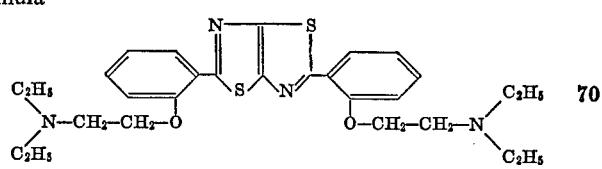

is obtained in yellow crystals melting at 148–149° C. Its bis-hydrochloride melts at 255° C. with decomposition.

The 2,5 - bis-(ortho-hydroxyphenyl)-thiazolo[5,4-d]thiazole used as starting material is prepared by heating a solution of 24 g. of dithiooxamide and 48.8 g. of salicylaldehyde in 150 cc. of dimethylforamide for 15 hours in a batah maintained at 170° C. It melts at 300 to 301° C.

EXAMPLE 4

16.2 g. of 2,5-bis-(2-hydroxy-3,5-dichlorophenyl)thiazolo[5,4-d]thiazole are added to a sodium alcoholate solution prepared from 1.65 g. of sodium and 500 cc. of alcohol. To form the sodium salt the batch is stirred for ½ hour at room temperature. 11.5 g. of β-diethylaminoethyl chloride are then added, the whole is heated for 4 hours at the boil, allowed to cool, and the precipitate is suctioned off and repeatedly washed with water. Recrystallisation from very much boiling alcohol yields the 2,5-bis - [2 - (β-diethylaminoethoxy)-3,5-dichlorophenyl]-thiazolo[5,4-d]thiazole of the formula

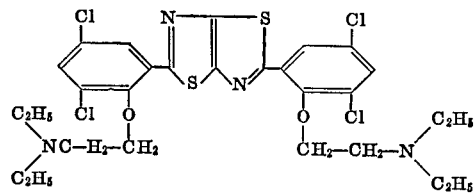

in yellow crystals melting at 165–167° C. The bis-hydrochloride had not yet melted at 30° C.

EVAMPLE 5

A mixture of 2 g. of 2,5-bis-[para-(β-chloroethoxy)-phenyl]-thiazolo[5,4-d]thiazole and 60 cc. of morpholine is heated for 10 hours in a bath at 110° C. The precipitate is then suctioned off, washed with water and recrystallised from much boiling alcohol, to yield 2,5-bis-[para-(β-morpholinoethoxy) - phenyl] - thiazolo[5,4-d]thiazole of the formula

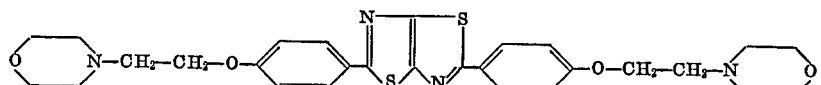

in yellow crystals melting at 199–200° C.

The 2,5 - bis - [para - (β-chloroethoxy)-phenyl]-thiazolo[5,4-d]thiazole used as starting material is prepared in the following manner:

8.8 g. of 2,5-bis-(para-hydroxyphenyl)-thiazolo[5,4-d]thiazole are added to a sodium alcoholate solution prepared from 1.35 g. of sodium and 400 cc. of alcohol. To the solution of the sodium salt 11 g. of 1-bromo-2-chloroethane are added, the mixture is heated for 15 hours at the boil, allowed to cool, and the precipitate is suctioned off and extracted by boiling with much hot alcohol, with part of the product remaining undissolved. The phase that has not dissolved in alcohol is recrystallised from hot tetrachloroethane, to yield 2,5-bis-[para-(β-chloroethoxy)-phenyl]-thiazolo[5,4-d]thiazole of the formula

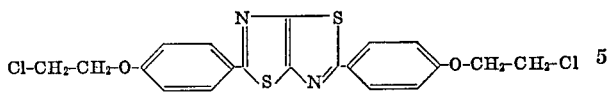

in yellow crystals melting at 198–200° C.

Crystallisation of the alcohol phase yields 2-(para-hydroxyphenyl) - 5 - [para - (β - chloroethoxy)-phenyl]-thiazolo[5,4-d]thiazole of the formula

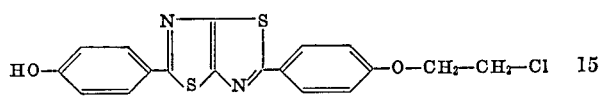

in the form of yellow crystals melting at 236–238° C.

EXAMPLE 6

A mixture of 2 g. of 2-(para-hydroxyphenyl)-5-[para-(β-chloroethoxy) - phenyl] - thiazolo[5,4-d]thiazole and 100 cc. of dimethylamine is heated in a closed tube for 6 hours at 95–100° C. The dimethylamine is evaporated and the residue washed with water and recrystallised from much alcohol, to yield 2-(para-hydroxyphenyl)-5-[para-(β - dimethylaminoethoxy) - phenyl] - thiazolo[5,4-d]thiazole of the formula

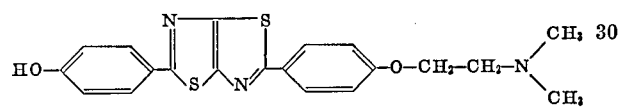

in the form of yellow crystals melting at 236–238° C.

When the above compound is reacted with sodium ethylate and β-dimethylaminoethyl chloride, the 2,5-bis-[para - (β - dimethylaminoethoxy) - phenyl] - thiazolo [5,4-d]thiazole of the formula

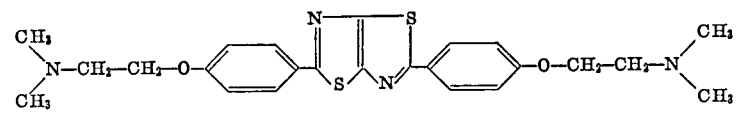

is obtained.

EXAMPLE 7

Tablets containing 100 mg. of 2,5-bis-[para-(β-diethylaminoethoxy) - phenyl] - thiazolo[5,4-d]thiazole hydrochloride may be prepared for example in the following manner:

| | Per tablet, mg. |
|---|---|
| 2,5 - bis - [para - (β - diethylaminoethoxy)-phenyl] thiazolo[5,4-d]thiazole hydrochloride | 100 |
| Lactose | 50 |
| Wheat starch | 50 |
| Colloidal silicic acid | 13 |
| Arrowroot | 24 |
| Talc | 12 |
| Magnesium stearate | 1 |
| | 250 |

Preparation 2,5 - bis - [para - (β - diethylaminoethoxy)-phenyl] thiazolo[5,4-d]thiazole hydrochloride is mixed with the lactose, part of the wheat starch and with the colloidal silicic acid, and the mixture forced through a sieve. The remainder of the wheat starch is pasted on the water bath with the 5-fold quantity of water, and the powder mixture kneaded with the paste until a slightly plastic mass is obtained.

The plastic mass is passed through a sieve with a mesh width of about 3 mm., dried, and the dry granulate forced through a sieve. Arrowroot, talc, and magnesium stearate are then admixed, and the resulting mixture compressed into tablets of 250 mg. each.

What is claimed is:

1. A member selected from the group consisting of compounds of the formula

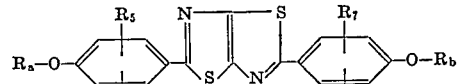

in which $R_a$ stands for the group of the formula

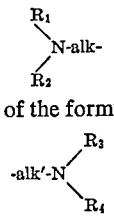

$R_b$ stands for the group of the formula $$-alk'-N\begin{matrix}R_3\\R_4\end{matrix}$$

alk and alk' each represents lower alkylene having 2 to 6 carbon atoms, $R_1$, $R_2$, $R_3$ and $R_4$ each stands for a member selected from the group consisting of hydrogen, lower alkyl, allyl, methallyl, and, $R_1$ and $R_2$ or $R_3$ and $R_4$ when taken together, for lower alkylene, pyrrolidino, piperidino, morpholino, N-lower alkyl-piperazino, N-(hydroxy-lower alkyl)-piperazino and piperazino, and $R_5$, $R_6$, $R_7$ and $R_8$ each stands for a member selected from the group consisting of hydrogen, lower alkyl, lower alkoxy, halogen and trifluoromethyl, each of said lower alkyl and lower alkoxy groups having 1 to 7 carbon atoms and acid addition salts thereof.

2. A member selected from the group consisting of compounds of the formula

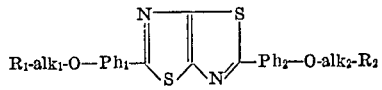

in which $Ph_1$ and $Ph_2$ each stands for a member selected from the group consisting of phenylene, lower alkyl-phenylene, lower alkoxy-phenylene, halogeno-phenylene and trifluoromethylphenylene, $alk_1$ and $alk_2$ each stands for lower alkylene having 2 to 6 carbon atoms and $R_1$ and $R_2$ each stands for di-lower alkylamino, pyrrolidino, piperidino, morpholino, N-lower alkyl-piperazino, N-(hydroxy-lower alkyl)-piperazino and piperazino, and acid addition salts thereof, each of said lower alkyl and lower alkoxy groups having 1 to 7 carbon atoms.

3. A member selected from the group consisting of compounds of the formula

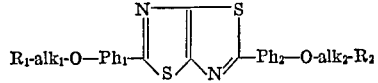

in which $Ph_1$ and $Ph_2$ each stands for a member selected from the group consisting of p-phenylene, lower alkyl-para-phenylene, lower alkoxy-para-phenylene, halogeno-para-phenylene and trifluoromethyl-para-phenylene, $alk_1$ and $alk_2$ each stands for lower alkylene having 2 to 6 carbon atoms and $R_1$ and $R_2$ each stands for di-lower alkylamino, pyrrolidino, piperidino, morpholino, N-lower alkyl-piperazino, N-(hydroxy-lower alkyl)-piperazino and piperazino, each of said lower alkyl and lower alkoxy groups having 1 to 7 carbon atoms, and acid addition salts thereof.

4. A member selected from the group consisting of 2,5-bis-[para-(β-diethylaminoethoxy)-phenyl] - thiazolo[5,4-d]-thiazole and an acid addition salt thereof.

5. A member selected from the group consisting of 2,5-bis-[para-($\beta$-dimethylamino - $\alpha$ - methylethoxy)-phenyl]-thiazolo[5,4-d]thiazole and an acid addition salt thereof.

6. A member selected from the group consisting of 2,5-bis-[ortho-($\beta$-diethylaminoethoxy)-phenyl] - thiazolo[5,4-d]thiazole and an acid addition salt thereof.

7. A member selected from the group consisting of 2,5-bis-[2-($\beta$-diethylaminoethoxy)-3,5 - dichlorophenyl]-thiazolo[5,4-d]thiazole and an acid addition salt thereof.

8. A member selected from the group consisting of 2,5-bis-[para-($\beta$-morpholinoethoxy) - phenyl] - thiazolo[5,4-d]thiazole and an acid addition salt thereof.

9. A member selected from the group consisting of 2,5-bis - [para - ($\beta$ - dimethylaminoethoxy) - phenyl] - thiazolo[5,4-d]-thiazole and an acid addition salt thereof.

References Cited

UNITED STATES PATENTS

| 1,915,334 | 6/1933 | Salzberg et al. | 260—243 |
| 2,075,359 | 3/1937 | Salzberg et al. | 167—22 |

ALEX MAZEL, *Primary Examiner.*

J. TOVAR, *Assistant Examiner.*

U.S. Cl. X.R.

260—247.1, 268, 293.4, 302, 306.8; 424—248, 250, 270